United States Patent
Linglet et al.

(10) Patent No.: US 6,779,651 B1
(45) Date of Patent: Aug. 24, 2004

(54) DEVICE FOR CONVEYING DISCRETE ENTITIES HAVING AN IMPROVED TRANSFER ARM, AND CONTAINER BLOW-MOLDING FACILITY WITH SUCH A DEVICE

(75) Inventors: Stephane Linglet, Le Havre Cedex (FR); Vincent Brachet, Le Havre Cedex (FR)

(73) Assignee: Sidel, Le Havre Cedex (FR)

( * ) Notice: Subject to any disclaimer, the term of this patent is extended or adjusted under 35 U.S.C. 154(b) by 0 days.

(21) Appl. No.: 10/149,010

(22) PCT Filed: Nov. 24, 2000

(86) PCT No.: PCT/FR00/03298
§ 371 (c)(1),
(2), (4) Date: Jul. 30, 2002

(87) PCT Pub. No.: WO01/44084
PCT Pub. Date: Jun. 21, 2001

(30) Foreign Application Priority Data

Dec. 13, 1999 (FR) .............................................. 99 15645

(51) Int. Cl.⁷ ......................... B65G 25/00; B65G 37/00; B65G 47/84; B65G 47/86; B65G 49/00
(52) U.S. Cl. ................................ 198/803.9; 198/470.1; 198/474.1; 198/803.12
(58) Field of Search ........................... 198/470.1, 474.1, 198/478.1, 803.9, 803.12; 264/538

(56) References Cited

U.S. PATENT DOCUMENTS

| | | | | |
|---|---|---|---|---|
| 4,391,578 A | * | 7/1983 | Schaar | 264/538 |
| 5,232,717 A | * | 8/1993 | Voss | 198/803.12 |
| 5,683,729 A | * | 11/1997 | Valles | 264/538 |

\* cited by examiner

Primary Examiner—Gene O. Crawford
(74) Attorney, Agent, or Firm—Sughrue Mion, PLLC

(57) ABSTRACT

A device for conveying discrete entities, including a rotary support bearing a telescopic transfer arm having a multi-directional head. The extension of the arm and the orientation of the gripper head are controlled by cams according to the angular position of the arm around the axis of rotation (A0) of the support. The extension of the arm and the orientation of the gripper head are controlled by a single tipper which is hinged on the outer radial part of the arm and which includes two cam followers which cooperate with an independent cam path.

13 Claims, 2 Drawing Sheets

Figure 1:
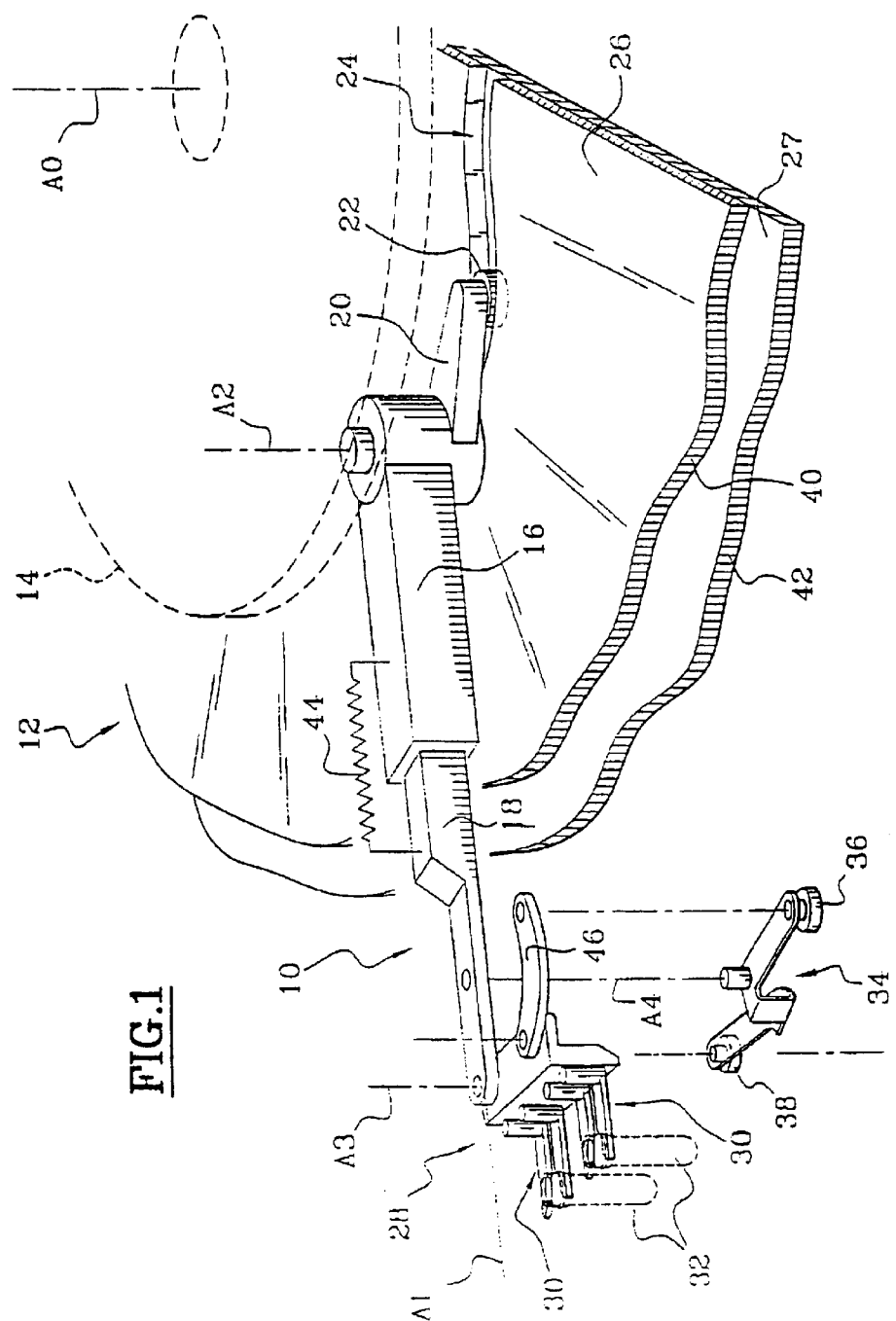

DEVICE FOR CONVEYING DISCRETE ENTITIES HAVING AN IMPROVED TRANSFER ARM, AND CONTAINER BLOW-MOLDING FACILITY WITH SUCH A DEVICE

The invention concerns systems for conveying discrete entities.

More particularly, it concerns a device for conveying discrete entities that has a support driven in continuous rotation around an axis and which carries a transfer arm.

The proposed transfer arm is telescopic and has an inner radial part attached to the support and an outer radial part that can slide with respect to the inner radial part along an extension axis in a plane appreciably perpendicular to the axis of rotation of the support. The extension of the arm is controlled by a cam system as a function of the angular position of the arm around the axis of rotation of the support.

The arm has a gripper head that is suitable for supporting at least one entity and which is mounted on the outer radial part of the arm rotatably around an orientation axis that is appreciably parallel to the axis of rotation of the support. The orientation of the gripper head is controlled by a cam system.

Conveyor devices of this type are found in container blow-molding machines in which the container is obtained through blow molding by introducing into a blow-mold a preform previously produced by injection molding. For example, these machines are used for manufacturing polyethylene terephtalate (PET) bottles. The preform is in the shape of a tube that is closed at one end, while the other end already has the final shape of the neck of the container.

The preform is placed inside the mold after being brought to a suitable temperature in a temperature conditioning oven. When inflated, each container is removed from the mold and sent to the outlet of the machine.

Numerous container blow-molding machines are of the rotary type. These have a carrousel that turns continuously around its axis and carries around its periphery a series of identical molds.

Transfer arm conveyor devices, also known as star-shaped transfer devices, make it possible to insert the preforms in the molds as well as to remove the containers once they are formed, without having to stop the carrousel. Variable extension transfer arms make it possible to avoid interference between the molds and the objects being transported.

Transfer arms like these are also used to place in a blow mold a body intended to be at least partly overmolded by the material of the container. This is particularly the case with handles associated with PET containers.

Moreover, it is sometimes necessary for the transported object to have a very specific final orientation. For example, in a blow-molding machine this could involve a particular orientation of the preform that has undergone a special heating in order to produce a flat bottle, or of the precise positioning of the handle in the blow mold.

However, there is an application in which the orientation of the gripper head of the transfer arms is particularly important: that is, "dual impression" machines in which each blow mold has two cavities in order to produce two containers simultaneously. The transfer arms must then simultaneously place two preforms in the blow mold, each of the preforms being received in one of the cavities. Once the two containers have been formed, they must be retrieved simultaneously by a transfer arm the gripper head of which has two pairs of grips.

To do this, transfer arms are known that have orientable gripper heads of the type described above. This type of transfer arm is found on the "dual impression" machines produced until now by the applicant. In these conveyor devices, the extension of the arm and the orientation of the gripper head are obtained by two cam systems that are independent of each other. Thus, the outer radial part of the arm has a cam follower that cooperates with a cam path so that it alone controls the extension of the arm. The gripper head, which is articulated at the end of the outer radial part, also carries a cam follower that cooperates with another cam path so that it alone controls the orientation of the head with respect to the arm's axis of extension.

This device, although it has been satisfactory, has certain limits to the amplitude of the movements that can be obtained. Moreover, it requires specific means to be provided in order to maintain the two cam followers in their respective cam paths.

A purpose of the invention is therefore to propose a new design of these transfer arms that will allow these limitations to be overcome.

To that end, the invention proposes a device of the type described above, characterized in that the extension of the arm and the orientation of the gripper head are controlled by a single rocker that is articulated on the outer radial part of the arm and which carries two cam followers each of which cooperates with an independent cam path.

According to other characteristics of the invention:

the rocker and the gripper head are combined;

the rocker and the gripper head are distinct from each other, the rocker controlling the orientation of the head by means of a transmission device;

the rocker and the gripper head are connected to each other by means of a link;

the rocker and the gripper head are articulated on the outer radial part of the arm around two different axes;

the connected cam paths that control the extension of the arm and the orientation of the head are each laid out along a closed loop around the axis of rotation of the support; elastic return means are provided to retract the outer radial part of the arm to a position of less extension in such a way that the two cam followers, which are arranged on the rocker on either side of a line parallel to the axis of extension passing through the axis of articulation of the rocker on the outer radial part of the arm, are pressed radially inward against the respective cam path;

the elastic return means are interposed between the inner and outer radial parts of the arm;

the device has at least two superimposed fixed plates each of which extends in a plane perpendicular to the axis of rotation of the support, the outer edge of each of the two plates forming one of the two cam paths that control the extension of the arm and the orientation of the head;

the inner radial part of the arm is mounted on the support so that it can pivot with respect to the latter around a pivot axis that is appreciably parallel to the axis of rotation of the support, and the pivoting of the arm with respect to the support is controlled as a function of the angular position of the support around its axis;

the pivoting of the arm with respect to the support is controlled by a cam system;

the gripper head can simultaneously support two entities; and the support has several identical transfer arms with orientable head.

The invention also concerns a facility for blow molding containers made of thermoplastic material from preforms previously produced by injection molding, characterized in that it has at least one conveying device incorporating any of the preceding characteristics.

Figure 2:
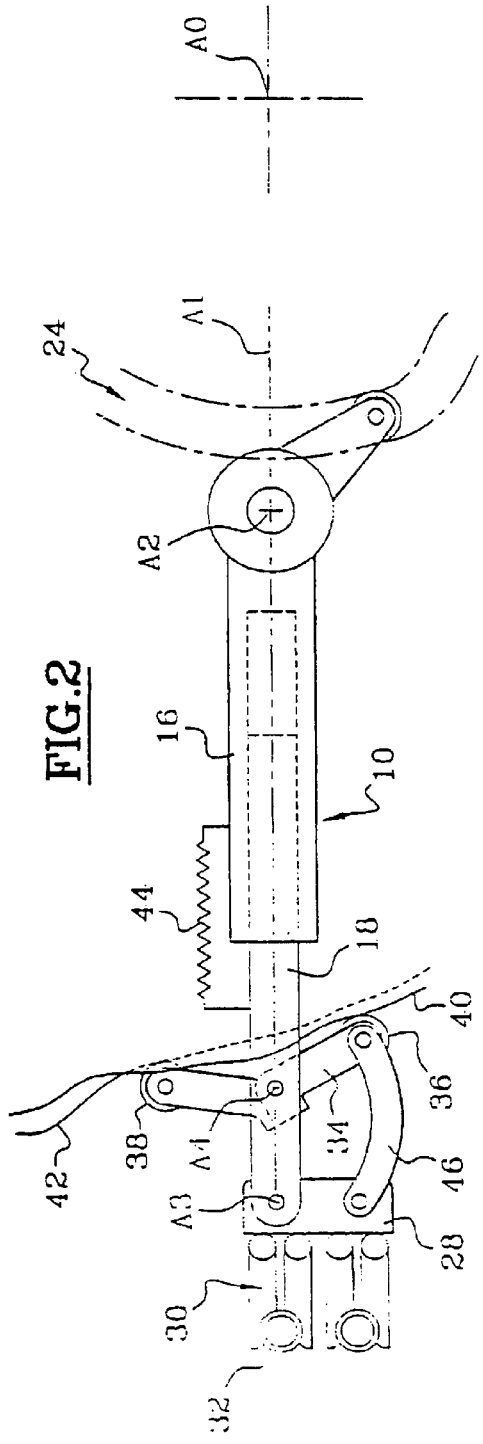
Figure 3:
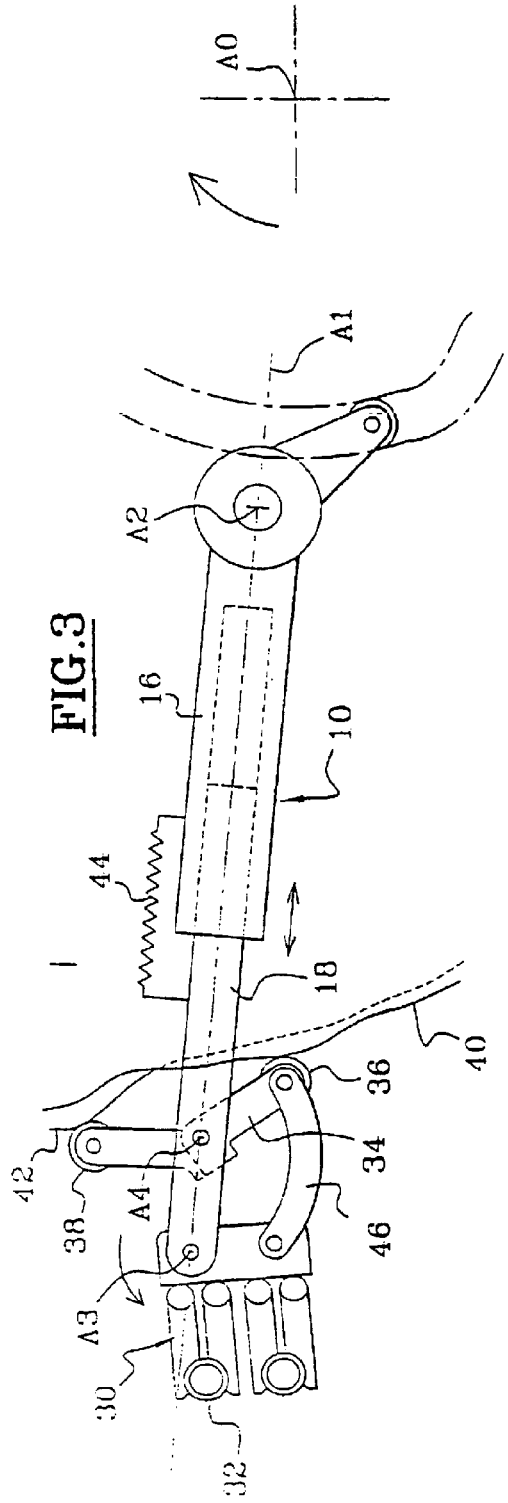

Other characteristics and advantages of the invention will appear from the following detailed description, as well as from the attached drawings in which:

FIG. 1 is a partial diagrammatical view, in perspective, of a conveying device according to the methods of the invention; and FIGS. 2 and 3 are diagrammatical top views of two positions of the transfer arm illustrated in FIG. 1, and in which the control of the arm's extension and of the orientation of the gripper head can be observed.

Represented in FIG. 1 is a transfer arm 10 of a star-shaped transfer device 12 of the type that can be found in machines that manufacture containers from PET by blow molding a preform, the preform being first obtained by injection molding, then reheated beyond the glass transition temperature of PET before being placed in a blow mold.

The star-shaped transfer device 12 can be used for conveying preforms, conveying containers, or conveying handles intended to be attached to these containers. Firstly, it has a plate-shaped support 14 that is driven in continuous rotation around an axis A0, which for the sake of simplicity, will be considered to be vertical. This support 14 therefore carries one or more transfer arms 10.

Each transfer arm 10 extends appreciably in a horizontal plane perpendicular to the axis A0, and has an inner radial part 16 and an outer radial part 18 that are integral with each other but which can slide with respect to each other along an extension axis A1 of the arm.

The inner radial part 16 of the arm 10 is attached to the periphery of the plate-shaped support 14 in such a way as to be able to pivot around an axis A2 which is parallel to the axis A0 but not merged therewith. The outer radial part 16 [sic], at the end, is equipped with a lever 20, a roller 22 that is intended to move in a groove 24 formed in a fixed control plate 26 that is appreciably horizontal. The groove 24 extends along a closed loop around the axis A0, the radial distance of the path of the groove 24 with respect to the axis A0 varying with the angular position around this axis. The roller 22 fits in the groove 24 in such a way as to rest radially inward or outward against one of the two lateral faces of the groove 24, in order to control the pivoting of the arm 10 in both directions around the axis A1.

Thus, when the support 14 drives the arm 10 in rotation around the axis A0, the roller 22 moves along the fixed groove 24 and controls the pivoting of the arm 10 around the axis A2. This pivoting makes it possible to accelerate or slow the movement of the free end of the arm with respect to the continuous rotation of the support 14.

The free end of the outer radial part 18 of the arm 10 is equipped with a gripper head 28 that is orientable around an axis A3 with respect to both parts 16, 18 of the arm 10. The axis of orientation A3 of the head is, for example, parallel to the axis of pivoting A2 of the arm 10. In this instance, the head 28 has two grips 30 in order to be able to simultaneously grasp two preforms 32 (or, at the outlet of the blow mold, two containers).

According to the invention, the extension of the arm 10 and the orientation of the head 28 with respect to the axis of extension of the arm 10 are controlled by a single rocker 34 that is articulated on the outer radial part 18 of the arm 10 and which is equipped with two cam followers 36, 38, each of which cooperates with an independent cam path 40, 42.

In the example illustrated, the rocker 34 is made in the form of an independent part of the head 28. Moreover, although these independent parts could have been articulated around the same axis, it was decided in the example illustrated to articulate the rocker 34 on the outer radial part 18 of the arm 10 around an axis A4 which is parallel to but different from the axis A3.

Furthermore, as a variation, the invention can also be implemented by providing that the cam followers 36, 38 be carried directly by the gripper head 28, the rocker 34 and the gripper head 28 then being combined.

In the example illustrated, the cam followers 36, 38 are made in the form of rollers mounted in rotation around their vertical axis at both ends of the rocker. The rocker is articulated on the arm 10 appreciably at its center so that the two rollers 36, 38 are laid out on either side of the extension axis of the arm 10.

Moreover, it can be seen that the two rollers 36, 38 are offset from each other along the direction of the axis A3. Indeed, the two cam paths 40, 42 with which they are intended to cooperate are formed by the peripheral edges of the two fixed plates 26, 27 each of which extends above the other [sic] in horizontal planes perpendicular to the axis A0. As in the example illustrated, it can be arranged that one 26 of the two plates is the same as the one in which the groove 24 is formed for controlling the pivoting of the arm 10. In any case, the cam paths therefore form a closed circuit around the axis A0, the separation from the axis varying as a function of the angular position around the axis A0.

As can be seen in the figures, elastic return means 44 tend to retract the arm 10 to a less extended position, that is, to draw back the outer radial part 18 of the arm 10 radially inward toward of the axis A2. These elastic means of return 44 are for example, made in the form of one or more tension springs the two ends of which are hooked on to the inner 16 and outer 18 radial parts of the arm 10, respectively.

By retracting the outer radial part 18 of the arm 10 inward, the elastic return means 44 press each of the two cam followers 36, 38 on to their respective cam paths 40, 42. Because the two rollers 36, 38 are arranged on either side of the point of articulation of the rocker 34, said rocker begins by being oriented around the axis A4 as a function of the respective radial separation of the two points of contact of the cam paths 40, 42 with respect to the axis A0. For a given position, the two rollers being in place in their cam path, the rocker 34 is radially blocked inward so that the extension of the arm 10 is fixed.

In the example illustrated, the rocker 34 being a different part of the gripper head 28, both parts must be connected by a transmission mechanism so that the orientation of the rocker around the axis A4 controls the orientation of the head 18 around the axis A3.

Thus, for example, it can be arranged for these two parts to be connected by a link 46 that is articulated at both its ends, at one end on the rocker 34 and at the other on the head 28. Obviously, the points of articulation of the link are not on the axis A4 of articulation of the rocker 34 or on the axis A3 of orientation of the head 28. Depending on the position of these points of articulation, the reduction ratio can be varied between the angular movement of the rocker 34 and that of the head 28.

As is evident from a comparison of FIGS. 2 and 3, when the support 14 turns around the axis A0, the arm 10 is actuated by a movement that is composed of two rotations around the axes A0 and A2, and, as a function of this compound movement, the rocker is moved along the cam paths 40, 42 to control the extension of the arm 10 and the orientation of the head 28.

The conveying device according to the invention is simple and reliable, and makes it possible to have a large amplitude for the orientation movement of the gripper head 28. This movement can also be achieved with relatively high speeds while obtaining a wide variation of orientation of the head 28 for a small overall movement of the arm 10.

Moreover, as can be seen, in this device it is the elastic return means that maintain the contact of the two cam followers 36, 38 on their respective cam paths 40, 42.

What is claimed is:

1. Device for conveying discrete entities, of the type having a support (14) which is driven in continuous rotation around an axis (A0) and which carries a transfer arm (10), of the type in which the transfer arm (10) is telescopic and has an inner radial part (16) attached to the support (14) and an outer radial part (18) that can slide with respect to the inner radial part (16) along an axis of extension (A1) contained in a plane that is appreciably perpendicular to the axis of rotation (A0) of the support (14), of the type in which the extension of the arm (10) is controlled by a cam system as a function of the angular position of the arm (10) around the axis (A0) of rotation of the support (14), of the type in which the arm (10) has a gripper head (28) that is suitable for supporting at least one entity (32) and which is mounted in rotation on the outer radial part (18) of the arm (10) around an orientation axis (A3) that is appreciably parallel to the axis of rotation (A0) of the support (14), and of the type in which the orientation of the gripper head (28) is controlled by a cam system, characterized in that the extension of the arm (10) and the orientation of the gripper head (28) are controlled by a single rocker (34) that is articulated on the outer radial part (18) of the arm and which carries two cam followers (36, 38), each of which cooperates with an independent cam groove (40, 42).

2. Conveying device according to claim 1, characterized in that the rocker and the gripper head are combined.

3. Conveying device according to claim 1, characterized in that it has at least two fixed superimposed plates (26, 27) each of which extends in a plane perpendicular to the axis of rotation (A0) of the support (14), the outer edge of each of the two plates forming one the two cam paths (40, 42) to control the extension of the arm (10) and the orientation of the head (28).

4. Conveying device according to claim 1, characterized in that the gripper head (28) can simultaneously support two entities (32).

5. Conveying device according to claim 1, characterized in that the support (14) has several identical transfer arms (10) with orientable head (28).

6. Facility for blow molding containers made of thermoplastic material from preforms previously produced by injection molding, characterized in that it has at least one conveying device in accordance with claim 1.

7. Conveying device according to claim 1, characterized in that the connected cam paths (40, 42) that control the extension of the arm (10) and the orientation of the head (28) are each laid out as a closed loop around the axis of rotation (A0) of the support (14), and in that elastic return means (44) are provided to retract the outer radial part (18) of the arm (10) to a less extended position so that the two cam followers (36, 38), that are arranged on the rocker (34) on either side of a line parallel to the axis of extension (A1) passing through the axis of articulation (A4) of the rocker (34) on the outer radial part (18) of the arm (10), are pressed radially inward against the respective cam paths (40, 42).

8. Conveying device according to claim 7, characterized in that the elastic return means (44) are interposed between the inner (16) and outer (18) radial parts of the arm (10).

9. Conveying device according to claim 1, characterized in that the inner radial part (16) of the arm (10) is mounted on the support (14) so that it can pivot with respect to the latter around a pivot axis (A2) that is appreciably parallel to the axis of rotation (A0) of the support (14), and in that the pivoting of the arm (10) with respect to the support (14) is controlled as a function of the angular position of the support (14) around its axis (A0).

10. Conveying device according to claim 9, characterized in that the pivoting of the arm (10) with respect to the support (14) is controlled by a cam system (22, 24).

11. Conveying device according to claim 1, characterized in that the rocker (34) and the gripper head (28) are distinct from each other, the rocker (34) controlling the orientation of the head (28) by means of a transmission device (46).

12. Conveying device according to claim 11, characterized in that the rocker (34) and the gripper head (28) are connected to each other by means of a link (46).

13. Conveying device according to claim 11, characterized in that the rocker (34) and the gripper head (28) are articulated on the outer radial part (18) of the arm (10) around two different axes (A3, A4).

* * * * *